United States Patent [19]

Venier

[11] Patent Number: 5,624,150
[45] Date of Patent: Apr. 29, 1997

[54] HINGE FASTENING STRUCTURE AND METHOD OF CREATING A HINGE PILLAR JOINT

[75] Inventor: Fabio Venier, Holland Landing, Canada

[73] Assignee: Multimatic, Inc., Markham, Canada

[21] Appl. No.: 592,342

[22] PCT Filed: Aug. 4, 1994

[86] PCT No.: PCT/CA94/00423

§ 371 Date: May 7, 1996

§ 102(e) Date: May 7, 1996

[87] PCT Pub. No.: WO95/04864

PCT Pub. Date: Feb. 16, 1995

[30] Foreign Application Priority Data

Aug. 9, 1993 [CA] Canada .................. 2103599
Aug. 9, 1993 [CA] Canada .................. 2116877
Mar. 23, 1994 [CA] Canada .................. 2119919

[51] Int. Cl.$^6$ ............................................. B62D 25/00
[52] U.S. Cl. .................. 296/146.11; 16/384; 49/502; 411/103; 411/107; 296/202
[58] Field of Search .................. 296/146.11, 202; 411/103, 107, 412; 49/502

[56] References Cited

U.S. PATENT DOCUMENTS 3,782,437  1/1974  Seckerson .................. 411/107

FOREIGN PATENT DOCUMENTS 0314950  5/1989  European Pat. Off. .
3630234  3/1988  Germany .
4034599  2/1992  Germany .
670125  5/1989  Switzerland .................. 411/412

*Primary Examiner*—David M. Mitchell
*Assistant Examiner*—Hoa B. Trinh
*Attorney, Agent, or Firm*—Pennie & Edmonds

[57] ABSTRACT

A hinge fastening structure and method of creating a hinge to box-section pillar joint which includes a fastener extending from the pillar outer panel to the pillar inner panel wherein the fastener includes first and second threaded portions of substantially identical pitch but different diameters adjacent to the head and the tip thereof respectively. The fastening structure and method may also be applicable for attaching other forms of hardware to box-section structures.

13 Claims, 6 Drawing Sheets

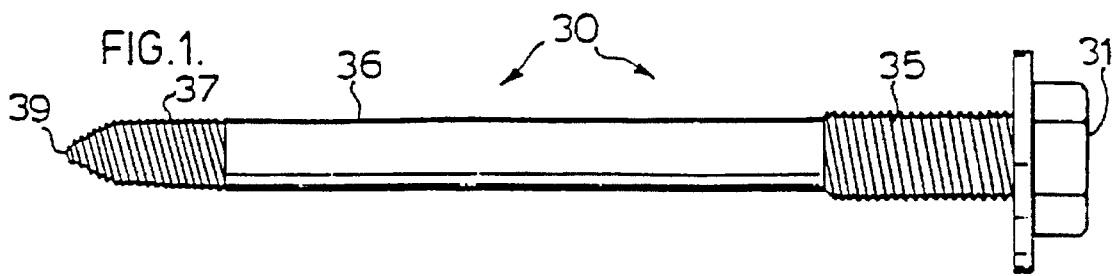
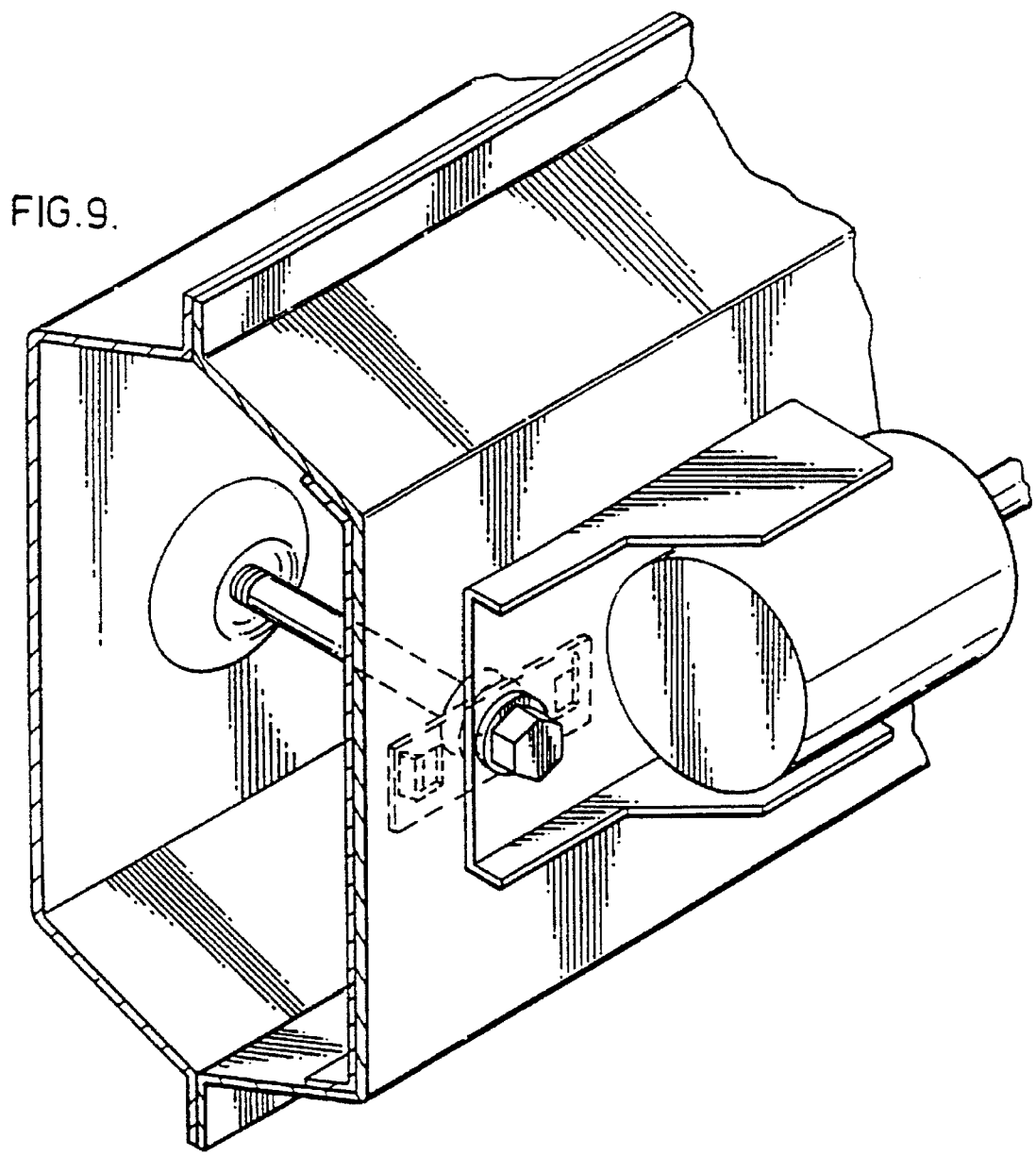

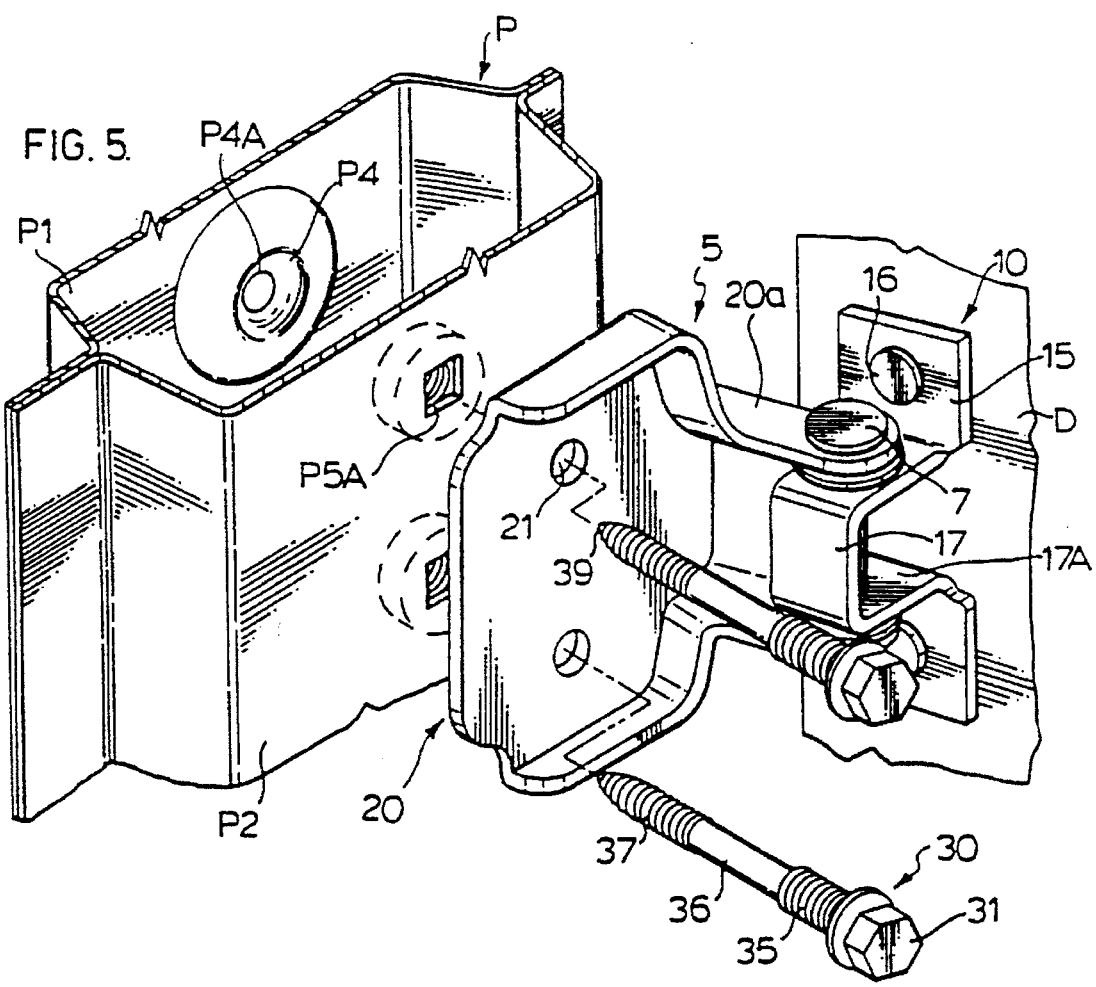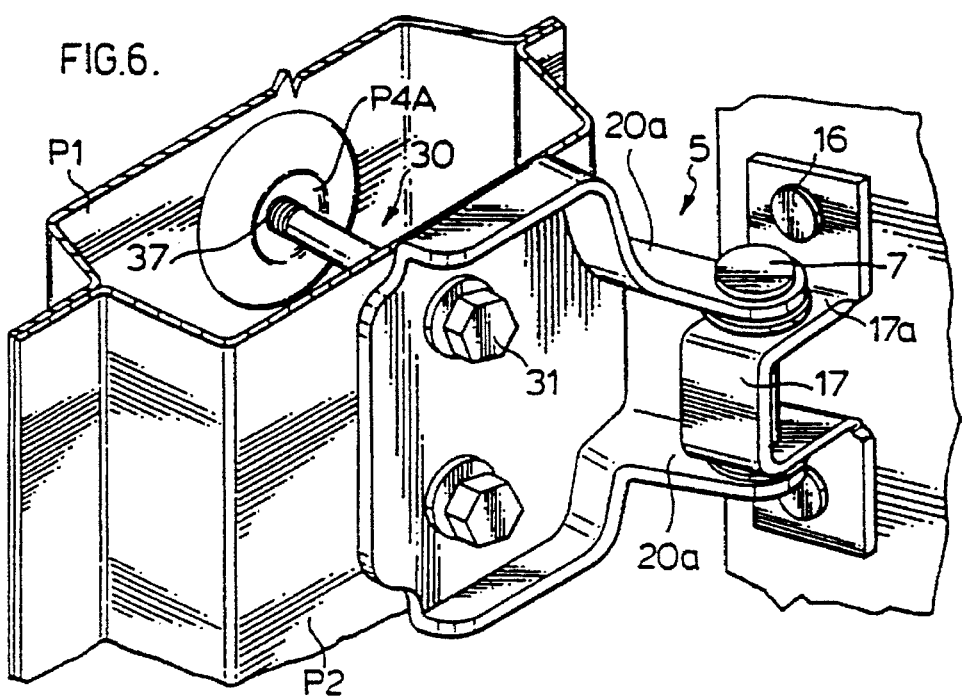

Zone A

HINGE FASTENING STRUCTURE AND METHOD OF CREATING A HINGE PILLAR JOINT

FIELD OF INVENTION

This invention relates to improvements in the mounting of hinges to vehicle hinge pillars and finds specific application to the mounting of a body half of a hinge to the box section created by an inner and outer panel forming the hinge pillar.

BACKGROUND OF THE INVENTION

In general, automotive door hinges are attached to the hinge pillar of a vehicle by means of bolted or welded connection. The hinge pillar is usually a vertically oriented box structure constructed from an inner hinge pillar panel and an outer hinge pillar panel. With few exceptions, it is generally accepted that the door hinges are attached to the outer hinge pillar panel only.

If an automotive door hinge is connected to the outer hinge pillar panel substantially as shown in FIGS. 7 and 8, the phenomenon known as, "oil canning" occurs in zone A of FIG. 7. This oil canning occurs due to the outer hinge pillar panel being of inadequate gauge to carry the sag and open overload forces imparted by the door. When a load is placed on the hinge, the outer hinge pillar panel will tend to flex in the vicinity of the hinge in the manner of the base of an oil can. This can lead to the creation of a permanent set in the outer hinge pillar panel and will ultimately lead to fit and finish problems with the door system as it becomes misaligned with the surrounding body structure. This will also tend adversely to affect the opening and closing of the door system as a whole.

Outer hinge pillar panels in isolation tend to be structurally incapable of carrying door hinge loads and usually require some form of secondary reinforcement. However, the completed hinge pillar structure, constructed from the outer and inner hinge pillar panels is far stiffer than its constitutive components and is capable of carrying much larger loads. A reinforcing member adjacent the outer hinge pillar panel, as illustrated in FIG. 8, has been used to help reduce oil canning, but the results so achieved have been less then desirable.

It has been previously proposed to use a fastener to fasten the hinge through the outer hinge pillar panel to the inner hinge pillar panel including a tube surrounding the fastener which acts as a spacer to ensure that the outer hinge pillar panel and the inner hinge pillar panel do not collapse towards one another. This arrangement possesses the advantage of spreading the applied hinge loadings into the entire pillar rather than concentrating them on the outer hinge pillar panel and therefore significantly reduces oil canning. However, inclusion of the tube makes manufacturing the joint extremely complex.

In the prior art it is also known to weld hinges to the hinge pillar. The structure includes a hinge essentially welded to the outer hinge pillar panel, passing through the pillar and tack welded to the inner hinge pillar panel. This again offers the advantage of spreading the applied hinge loadings into the entire pillar rather than concentrating them on the outer hinge pillar panel. However, such a hinge is difficult to repair. In addition, often water may enter the hinge pillar if the weld is not properly completed leading to rust problems. An example of such a device is found in a hinge integral with a hinge pin receiving opening manufactured by Ed Scharwächter GmbH & Co. LG which is welded, not fastened, to the hinge pillar.

The present invention overcomes the problems of the prior art while providing for a strong and stable fastening structure and joint. The present invention also provides a low cost and simple means of fastening a door hinge to a vehicle.

It is therefore a basic objective of this invention to provide a hinge fastening structure and a method of creating a hinge joint which is simple, efficient and effective.

It is a further object of this invention to provide a hardware fastening structure and a method for attaching hardware to box-section structures.

It is a further object of the invention to provide a fastening structure and method of fastening which improves the overall performance of the hinge joint particularly with regard to resistance to applied loads.

It is a further object of the invention to provide a hinge fastening means with reduced weight.

It is a further object of the invention to provide a hinge fastening structure with improved rigidity.

It is a further object of the invention to provide a novel fastener for mounting hinges to hinge pillars.

Further and other objects of the invention will become apparent to those skilled in the art when considering the full summary of the invention and the more detailed description of the preferred embodiments illustrated herein.

SUMMARY OF THE INVENTION

According to a primary aspect of the invention, there is provided a hinge fastening structure comprising a hinge, a pillar, a bolt, and a threaded retaining plate;

said pillar comprising an outer panel with a first opening and an inner panel with a smaller second opening located in a concave portion of the inner panel, said openings in the inner and outer panels being substantially aligned along an axis perpendicular to the inner and outer panels;

the bolt comprising a head, a tip, a shank, and first and second threaded portions wherein:

the head is shaped to engage a turning tool to permit the bolt to be rotated;

the shank is of a pre-determined length;

the tip has means for tapping into the second opening in the inner panel;

the first threaded portion is substantially adjacent the head, has a specific pitch, and has a first outer diameter and a first inner diameter, the first opening in the outer panel being such as to permit the shank, but not the head, to pass there-through;

the second threaded portion is substantially adjacent the tip, has substantially the identical pitch as the first threaded portion, and has a second outer diameter less than the first inner diameter of the first threaded portion;

the threaded retaining plate being located on the outer panel adjacent the first opening, and being adapted to engage the fast threaded portion of the bolt.

According to another aspect of the invention, the second opening is substantially circular.

According to another aspect of the invention, the thread of the fast threaded portion engages the threaded retaining plate and thereafter advances the bolt into the pillar at a rate determined by the thread pitch, so that the second threaded portion thereafter engages and self-taps the opening in the inner hinge pillar panel, the alignment of the fastener and opening being aided by the concave formation in the inner hinge pillar panel and the moveable, self-adjusting nature of the threaded retaining plate.

According to a further aspect of the invention, the concave second opening lies between the planes of the inner panel and the outer panel.

According to a further aspect of the invention, upon continued turning of the bolt in a fastening direction, both threads are engaged in their respective hinge pillar panels and when completely fastened, create a bolt-through joint for mounting a hinge with a hinge pillar, while substantially maintaining the distance pre-established between the inner hinge pillar panel and the outer hinge pillar panel, with the hinge clamping torque maintained through the joint formed by the self-adjusting threaded plate on the outer hinge pillar panel and the first threaded portion.

According to a further aspect of the invention, the tip does not extend beyond the plane of the inner panel even at its point of maximum penetration into the pillar.

According to another aspect of the invention, the method of creating the fastening structure comprises the steps of:

(a) mounting the hinge using the bolt described above to the box section hinge pillar so that the second threaded portion extends easily through the opening in the outer hinge pillar panel until such time as the leading portion of the thread of the first threaded portion engages a self-adjusting threaded retaining plate provided with the hinge pillar outer panel;

(b) rotating said bolt in the fastening direction so that the self-tapping second threaded portion of the bolt is guided to the opening in the inner hinge pillar panel by the concave formation thereof, while the self-adjusting threaded retainer plate self-adjusts into alignment with the opening in the inner hinge pillar panel, such that continued rotation of the fastener in the fastening direction causes the opening in the inner hinge pillar panel to be tapped by the self-tapping second threaded portion of the bolt;

(c) continuing to rotate the bolt so that both threaded sections engage the respective hinge pillar panels so as to create, when completely fastened, a stiffened box section for mounting the hinge with the hinge pillar while maintaining the required hinge retention clamping torque using the joint created by the self-adjusting threaded retaining plate and the first threaded portion of the fastener;

(d) creating a stiffened box thereby reducing the amount of hinge deflection and permanent set due to applied door loadings while substantially maintaining the distance between the inner hinge pillar panel and the outer hinge pillar panel.

According to another aspect of this invention, there is provided a hardware fastening structure comprising the hardware to be fastened, a box-section structure, a bolt, and a threaded retaining plate;

said box-section structure comprising an outer panel with a first opening and an inner panel with a smaller second opening located in a concave portion of the inner panel, said openings in the inner and outer panels being substantially aligned along an axis perpendicular to the inner and outer panels;

the bolt comprising a head, a tip, a shank, and first and second threaded portions wherein:

the head is shaped to engage a turning tool to permit the bolt to be rotated;

the shank is of a pre-determined length;

the tip has means for tapping into the second opening in the inner panel;

the first threaded portion is substantially adjacent the head, has a specific pitch, and has a first outer diameter and a first inner diameter, the first opening in the outer panel being such as to permit the shank, but not the head, to pass them-through;

the second threaded portion is substantially adjacent the tip, has substantially the identical pitch as the first threaded portion, and has a second outer diameter less than the fast inner diameter of the first threaded portion;

the threaded retaining plate being located on the outer panel adjacent the fast opening, and being adapted to engage the fast threaded portion of the bolt.

BRIEF DESCRIPTION OF THE DRAWINGS

The invention will now be illustrated with respect to the following drawings illustrating embodiments of the invention in which:

FIG. 1 is a plan view of a typical threaded bolt fastener.

FIG. 5 and FIG. 6 are perspective views of the cross sectional view of FIG. 4.

FIG. 9 is a perspective view of hardware being mounted to a box section structure in the manner of the invention.

DETAILED DESCRIPTION OF PREFERRED EMBODIMENTS OF THE INVENTION

Figure 2:
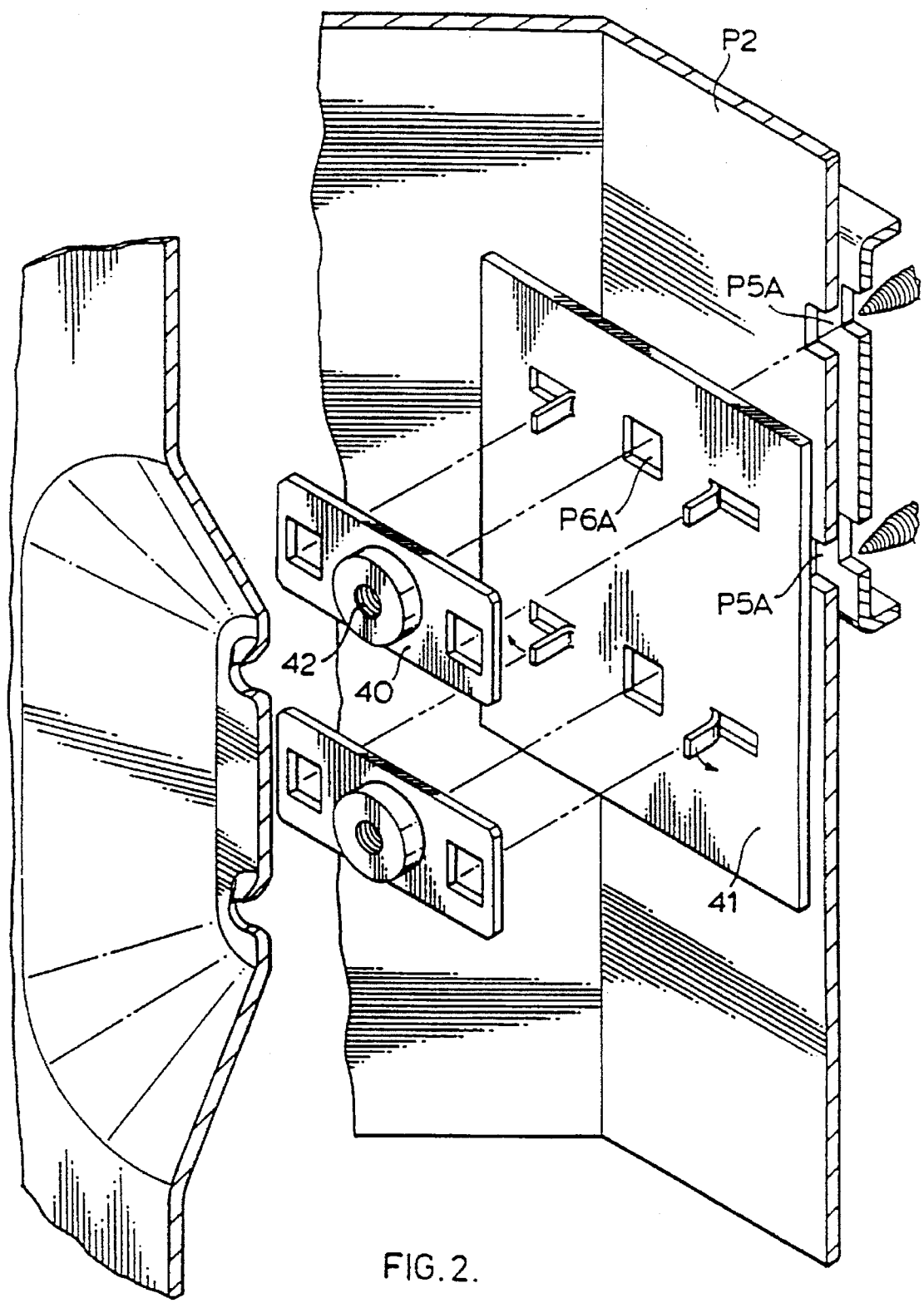
FIG. 2 is an exploded cut away, perspective view illustrating the relationship between a self-adjusting threaded retainer plate, a backing plate, and the interior wall of an outer hinge pillar panel.

Referring now to FIG. 1, there is illustrated a bolt 30 comprising a head 31, a tip 39, a first threaded portion 35 substantially adjacent the head 31, a second threaded portion 37 adjacent the tip, having an outer diameter less than the inner diameter of the fast threaded portion, and a shank portion 36 lying between the first and second threaded portions.

Referring now m FIG. 2, there is illustrated a self-adjusting retainer plate 40 which is loosely clamped to a backing plate 41 welded to the interior of an outer hinge pillar panel P2, such that the threaded opening 42 of the retainer plate 40 aligns with the openings P6A and P5A respectively in the backing plate 41 and the outer hinge pillar panel 172. Such attachment of the threaded self-adjusting retainer plate is conventional.

Figure 3:
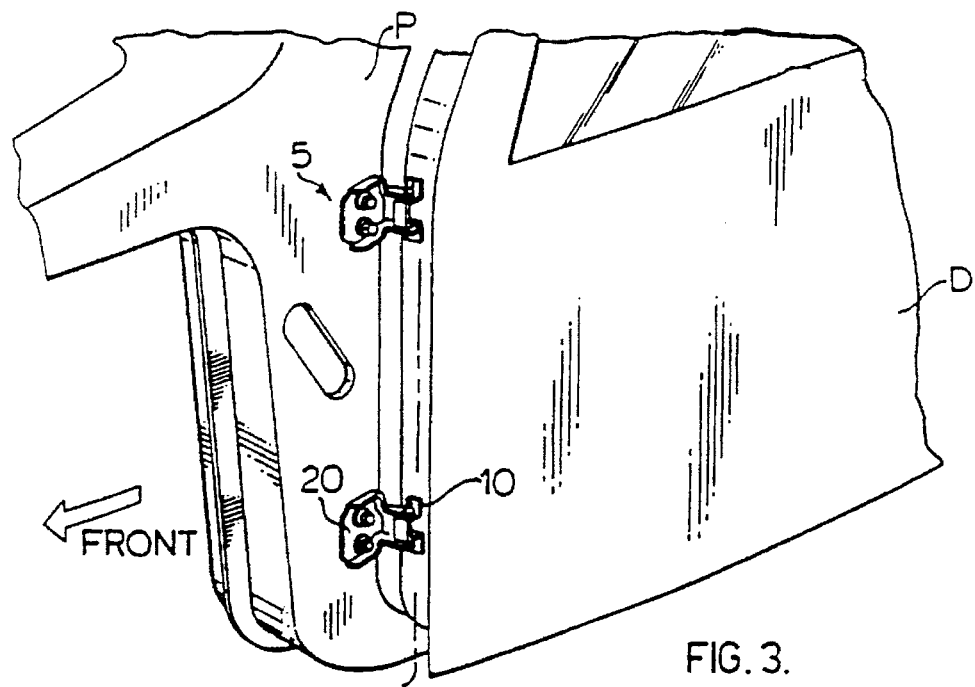
FIG. 3 is a cut away perspective view of a door being mounted with a hinge pillar and illustrated in a preferred embodiment of the invention.

Referring now to FIG. 3 there is illustrated a door D being suspended from a pillar P of a vehicle not shown. A conventional hinge 5 is provided which includes a door half 10 and a body half 20.

Figure 2A:
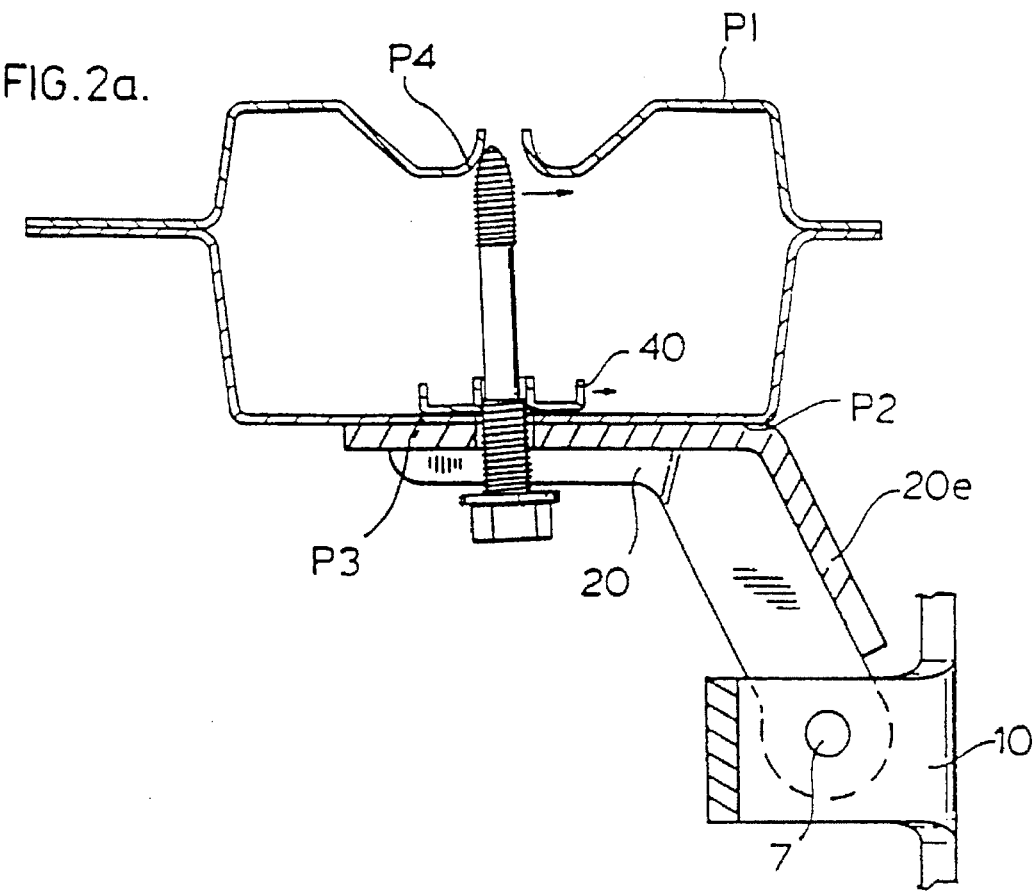
FIG. 2a is a cross-sectional top view of the hinge pillar, hinge, and joint showing the bolt positioned in the joint prior to being aligned.
Figure 2B:
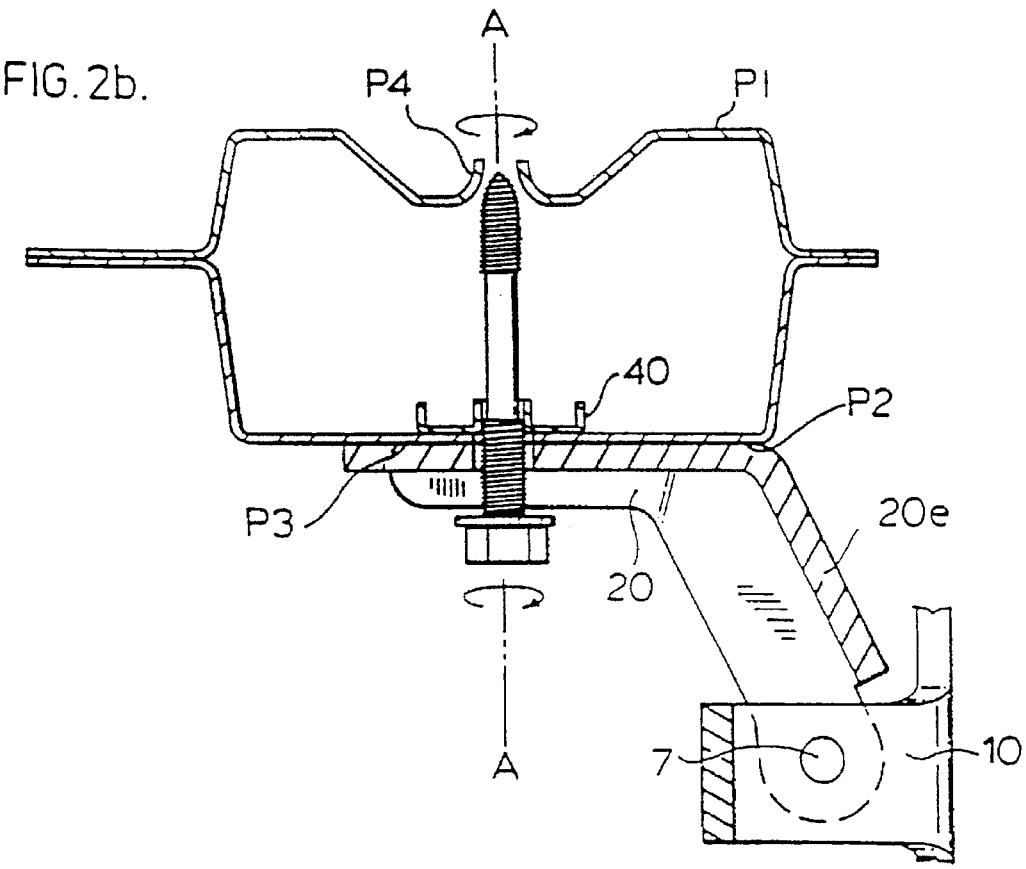
Figure 4:
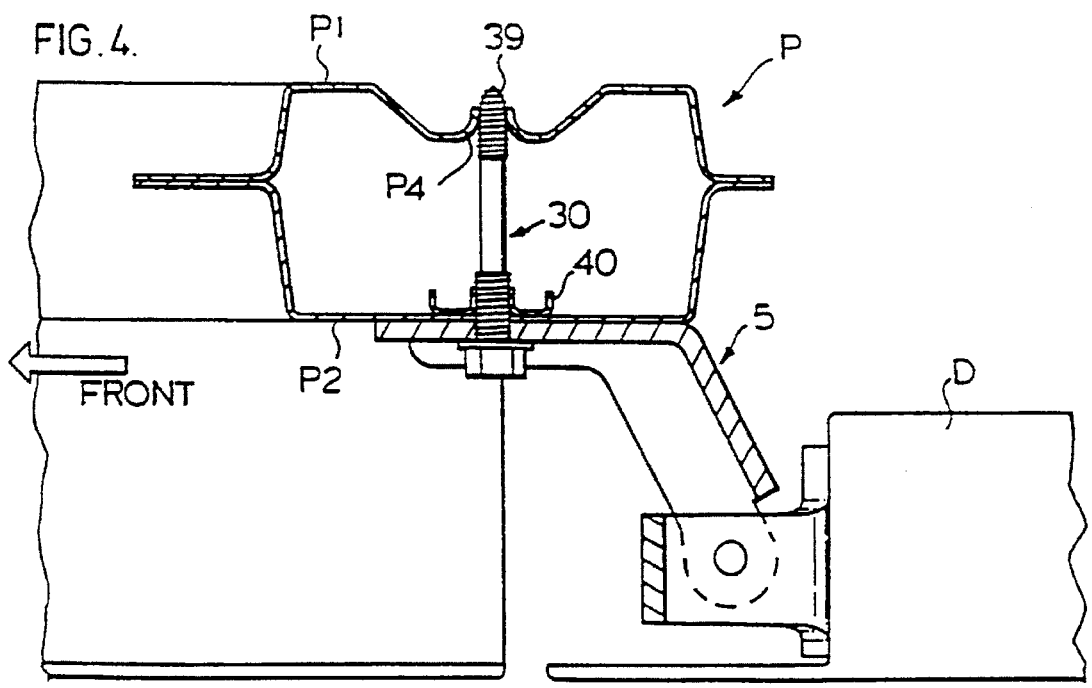
FIG. 4 is a cut away view of the hinge pillar and the joint of FIG. 3 shown in cross-section top view and illustrated in a preferred embodiment of the invention.

Referring now to FIGS. 2a, 2b, 4, 5 and 6, inner hinge pillar panel P1 and outer hinge pillar panel P2 include respective openings P4a, which is preferably circular, and P5a, and wherein opening P4a is located in a concave portion of inner panel P1, specifically the concave material P4. A threaded fastener 30, typically a bolt, extends through the opening of the body half of the hinge 20. The fastener has a head 31, an adjacent larger diameter first thread 35, a tip 39, and an adjacent smaller diameter second thread 37. The threads are typically separated by an unthreaded shank section 36. The pitch of the threads 37 and 35 is substantially equal. The major (or outer) diameter of second thread 37 is less then the minor (or inner) diameter of first thread 35. When the fastener is inserted through the hinge opening 21 and into the pillar P, the smaller diameter shank portion 36 and the second thread 37 will pass through the larger opening P5a until just prior to the second thread 37 entering the opening P4a and the surrounding concave material P4. Hinge surface 20e preferably engages outer surface P3 of outer hinge pillar P2. The leading edge of the first thread 35 engages the retainer plate 40 which is self-adjusting, as shown in FIG. 2a. Continued turning of the fastener 30 causes the tip 39 to engage the material P4 surrounding the opening P4a such that the second thread 37 will serf-tap into the material P4 which remains concave, as shown in FIG. 2b. In one embodiment, illustrated in FIG. 2a and 2b, the tip 39 does not extend beyond the plane of the inner panel P1 even when the fastener is fully tightened, as shown in FIG. 4. FIG. 2a shows bolt 30 prior to alignment with concave opening P4a. As second thread 37 taps into material P4 as shown in FIG. 2b, retainer plate 40 serf-adjusts to bring the fastener 30 into alignment substantially perpendicular to inner and outer hinge pillar panels P1 and P2. When the fastener is completely tightened, a bolt through joint for the hinge is created which maintains the distance pre-established between the inner and outer hinge pillar panels P1 and P2 respectively as shown in FIG. 4. Obviously, more than one fastener may be used to hold a single hinge to a pillar, as illustrated in FIG. 3.

The attachment of the hinge to the door is of conventional construction. As illustrated in FIGS. 5 and 6, the body haft of the hinge 20 includes laterally extending portions 20a having openings extending therethrough for receiving a hinge pin 7. The pin extends through the door half openings (not shown) which are disposed in the substantially rectangular portions 17 and the laterally extending arms thereof 17a which extend to vertically extending portions 15 having openings (not shown) for receiving second fastener 16 for mounting to the door skin.

Figure 7:
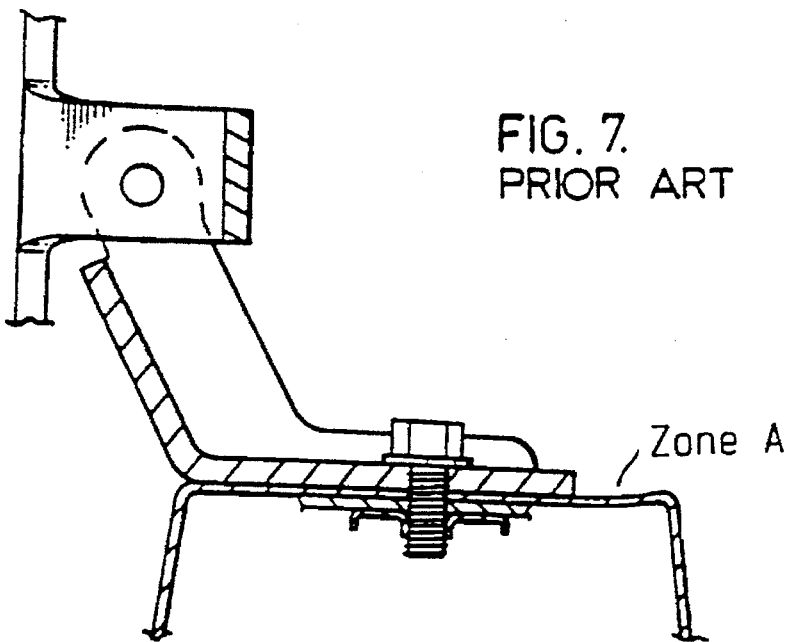
FIG. 7 and FIG. 8 are cut away views of a prior art pillar and joint shown in cross-section top view, illustrating in FIG. 7 the condition of "oil canning."
Figure 8:
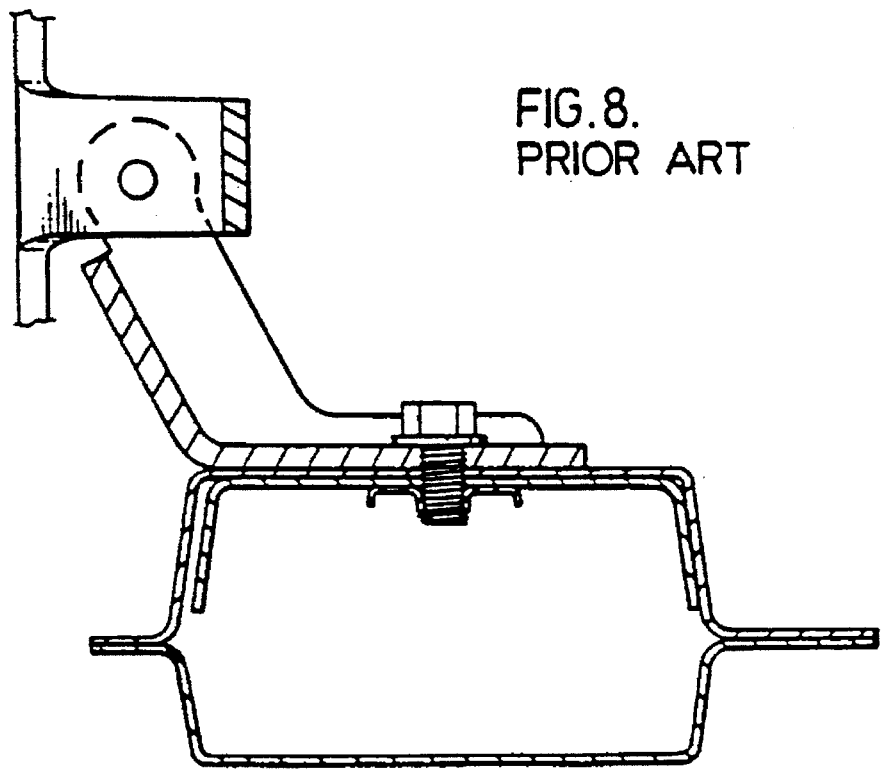

Providing a fastener which bolts through the hinge pillar outer panel to the hinge pillar inner panel significantly increases the overall door system stiffness in comparison with prior art systems such as that illustrated in FIGS. 7 and 8, thus reducing the loaded deflection and set of the system when subjected to operation forces such as open overload and vertical loadings. A reduction in the incidence of oil canning is also realized. In addition, the distance of separation defined by the manufacturer between the hinge pillar outer panel and the hinge pillar inner panel is substantially maintained.

Manufacturers of vehicles have developed comprehensive standards for the structural performance of door systems. A door system comprises the door, door hinges and hinge pillar. The two main stiffness related considerations are: 1) the effect of a vertical load applied to the door; and 2) the effect of an open overload torque against the fully open hinge stop such as in a strong wind or severe downgrade situation. These effects can be tested by applying simulated loads to the door. The simulated vertical loading is usually applied at the door's latch point which results in a deflection of the hinge referred to as sag and which may result in a permanent set in the pillar when the load is removed. The open overloading is also usually applied at the latch point and results in an angular over-rotation of the door past the normal stop position as well as a permanent set in the pillar when the load is removed. Testing of through-bolted systems indicates that the system stiffness can be increased over conventional fastening by up to 20% for sag and up to 50% for open overload.

Most conventional through-bolting systems produce the final fastener torque and resulting hinge clamping load using a threaded plate on the inner hinge pillar panel. Some form of spacer is then incorporated between the outer hinge pillar panel and inner hinge pillar panel so that the panel spacing and fastener torque is maintained. This assures that the hinge clamping load is maintained and no sag deflection results from hinge slippage. Comprehensive testing of the proposed fastening system indicates that less than 5% of the fastener torque is lost during multiple system loadings with no spacer installed.

Although the invention is particularly useful for the mounting of hinges to box-section pillars, any suitable hardware can be mounted to box-section structures using the structure and method of the invention as illustrated in FIG. 9.

As many changes can be made to the invention without departing from the scope thereof, it is intended that all material contained herein be interpreted as illustrative of the invention and not in a limiting sense.

The embodiments of the invention in which an exclusive property or privilege is claimed are as follows:

1. A hinge fastening structure comprising a hinge, a pillar, a bolt and a threaded retaining plate;
   wherein the pillar comprises an outer panel with a fast opening and an inner panel with a smaller second opening located in a concave portion of the inner panel, the openings in the inner and outer panels being substantially aligned along an axis perpendicular to the inner and outer panels; and
   wherein the bolt comprises a head, a shank, a tip and first and second threaded portions wherein:
   (a) the head is shaped to engage a turning tool to permit the bolt to be rotated;
   (b) the shank is of a predetermined length;
   (c) the tip has means for tapping into the second opening in the inner panel;
   (d) the fast threaded portion is substantially adjacent the head, has a specific pitch, and has a first outer diameter and a first inner diameter, the first opening on the outer panel being such as to permit the shank, but not the head, to pass there-through;
   (e) the second threaded portion is substantially adjacent the tip, has substantially the identical pitch as the first threaded portion, and has a second outer diameter less than the fast inner diameter of the fast threaded portion;
   wherein the threaded retaining plate is located on the outer panel adjacent the first opening, and is adapted to engage the first threaded portion of the bolt.

2. The hinge fastening structure of claim 1 wherein the second opening is substantially circular.

3. The hinge fastening structure of claim 1 or 2 wherein the threaded retaining plate is moveable and serf-adjusting.

4. The hinge fastening structure of claim 1 or 2 wherein the concave second opening lies between the planes of the inner panel and the outer panel.

5. The hinge fastening structure of claim 4 wherein the tip does not extend beyond the plane of the inner panel.

6. A joint for mounting a door hinge to a box section hinge pillar, said hinge pillar comprising an inner hinge pillar panel and an outer hinge pillar panel having openings, substantially aligned with one another, for receiving a bolt;

the opening in the outer hinge pillar panel including a self-adjusting threaded retaining plate for engaging the threads of a bolt;

the opening in the outer hinge panel being of suitable size to allow adjustment of the threaded retaining plate into alignment with the opening in the inner hinge pillar panel;

the opening in the inner hinge pillar panel being located in a concave formation of the inner hinge pillar panel suitable for guiding the tip of the bolt into the opening, and being suitably sized to allow the bolt to serf-tap the opening;

the bolt comprising a head and a tip and having disposed adjacent the head a first threaded portion of a predetermined first outer diameter and first inner diameter, and having a predetermined pitch;

the tip of the bolt having a serf-tapping second threaded portion of a predetermined second outer diameter and second inner diameter, and having a pitch substantially equal to the pitch of the fast threaded portion;

the second outer diameter being less than the fast inner diameter;

the fast and second threaded portions being separated by an unthreaded shank portion of predetermined length, and having a diameter less than or equal to the fast inner diameter;

wherein the self-adjusting threaded retaining plate engages the fast threaded portion and the opening in the inner hinge pillar panel engages the second threaded portion.

7. The joint of claim 6 wherein the concave formation in the inner hinge pillar panel lies between the planes of the inner panel and the outer panel.

8. The joint of claim 6 or 7 wherein the tip does not extend beyond the plane of the inner panel.

9. A method of fastening a hinge to a box section hinge pillar, the hinge pillar having an inner panel and an outer panel having openings; the opening in the outer panel including a self-adjusting threaded retaining plate for engaging the threads of a bolt; the opening in the inner panel being located in a concave formation of the inner panel suitable for guiding the tip of the bolt into the second opening; the bolt comprising a head and a tip and having disposed adjacent the head a fast threaded portion of a predetermined fast outer diameter and fast inner diameter, and having a predetermined pitch; the tip of the bolt having a self-tapping second threaded portion of a predetermined second outer diameter and second inner diameter, and having a pitch substantially equal to the pitch of the fast threaded portion; the second outer diameter sized to be smaller than the fast inner diameter; the method comprising the steps of:

(a) mounting the hinge onto the pillar;

(b) inserting the bolt through an opening in the hinge into the opening of the outer panel until the leading thread of the fast threaded portion engages the threaded retaining plate;

(c) advancing the bolt into the pillar by rotating it in the fastening direction;

(d) engaging the opening in the inner panel with the self-tapping second threaded portion;

(e) turning the bolt in a fastening direction to engage both fast and second threaded portions in their respective pillar panels;

(f) assisting the alignment of the bolt by means of the concave formation of the inner panel and the self-adjusting ability of the threaded retaining plate;

(g) substantially maintaining the distance pre-established between the inner panel and the outer panel with hinge clamping torque maintained through the joint formed by the self-adjusting threaded retaining plate on the outer panel and the fast threaded portion.

10. A method of creating a hinge fastening structure comprising a hinge, a bolt, a box section hinge pillar, and a threaded retaining plate, wherein: the pillar comprises an outer panel with a first opening and an inner panel with a smaller second opening in a concave portion thereof; the bolt comprises a head, a shank, a tip, and fast and second threaded portions; the first threaded portion is substantially adjacent the head, has a specific pitch, and has a fast outer diameter and a fast inner diameter, the first opening being such as to permit the shank but not the head to pass therethrough; the second threaded portion is substantially adjacent the tip, has substantially the identical pitch as the fast threaded portion, and has a second outer diameter less than the fast inner diameter of the fast threaded portion; and the threaded retaining plate is located on the outer panel adjacent the first opening and is adapted to engage the fast threaded portion of the bolt; the method comprising:

(a) mounting the hinge to the box section hinge pillar using the bolt so that the second threaded portion extends easily through the opening in the outer hinge pillar panel until such time as the leading portion of the thread of the fast threaded portion engages a self-adjusting threaded retaining plate provided with the hinge pillar outer panel;

(b) rotating said bolt in the fastening direction so that the self-tapping second threaded portion of the bolt is guided to the opening in the inner hinge pillar panel by the concave formation thereof, while the self-adjusting threaded retainer plate self-adjusts into alignment with the opening in the inner hinge pillar panel, such that continued rotation of the fastener in the fastening direction causes the opening in the inner hinge pillar panel to be tapped by the serf-tapping second threaded portion of the bolt;

(c) continuing to rotate the bolt so that both threaded sections engage the respective hinge pillar panels so as to create, when completely fastened, a stiffened box section for mounting the hinge with the hinge pillar while maintaining the required hinge retention clamping torque using the joint created by the self-adjusting threaded retaining plate and the first threaded portion of the fastener;

(d) creating a stiffened box thereby reducing the amount of hinge deflection and permanent set due m applied door loadings while substantially maintaining the distance between the inner hinge pillar panel and the outer hinge pillar panel.

11. A hardware fastening structure comprising hardware, a box section structure, a bolt and a threaded retaining plate;

wherein the box section structure comprises an outer panel with a first opening and an inner panel with a smaller second opening located in a concave portion of the inner panel, the openings in the inner and outer panels being substantially aligned along an axis perpendicular to the inner and outer panels; and wherein the bolt comprises a head, a shank, a tip and first and second threaded portions wherein:

(a) the head is shaped to engage a mining tool to permit the bolt to be rotated;

(b) the shank is of a predetermined length;
(c) the tip has means for tapping into the second opening in the inner panel;
(d) the first threaded portion is substantially adjacent the head, has a specific pitch, and has a fast outer diameter and a fast inner diameter, the fast opening on the outer panel being such as to permit the shank, but not the head, to pass them-through;
(e) the second threaded portion is substantially adjacent the tip, has substantially the identical pitch as the first threaded portion, and has a second outer diameter less than the first inner diameter of the first threaded portion;

wherein the threaded retaining plate is located on the outer panel adjacent the first opening, and is adapted to engage the first threaded portion of the bolt.

12. The hardware fastening structure of claim 11 wherein the threaded retaining plate is moveable and self-adjusting.

13. A method of fastening hardware to a box section structure, the box section structure having an inner panel and an outer panel having openings; the opening in the outer panel including a self-adjusting threaded retaining plate for engaging the threads of a bolt; the opening in the inner panel being located in a concave formation of the inner panel suitable for guiding the tip of the bolt into the second opening; the bolt comprising a head and a tip and having disposed adjacent the head a first threaded portion of a predetermined first outer diameter and first inner diameter, and having a predetermined pitch; the tip of the bolt having a self-tapping second threaded portion of a predetermined second outer diameter and second inner diameter, and having a pitch substantially equal to the pitch of the first threaded portion; the second outer diameter sized to be smaller than the first inner diameter; the method comprising the steps of:

(a) mounting the hardware onto the box section structure;
(b) inserting the bolt through an opening in the hardware into the opening of the outer panel until the leading thread of the first threaded portion engages the threaded retaining plate;
(c) advancing the bolt into the box section structure by rotating it in the fastening direction;
(d) engaging the opening in the inner panel with the self-tapping second threaded portion.
(e) turning the bolt in a fastening direction to engage both first and second threaded portions in their respective panels;
(f) assisting the alignment of the bolt by means of the concave formation of the inner panel and the self-adjusting ability of the threaded retaining plate;
(g) substantially maintaining the distance pre-established between the inner panel and the outer panel with hardware clamping torque maintained through the joint formed by the self-adjusting threaded retaining plate on the outer panel and the first threaded portion.

* * * * *